(12) United States Patent
Avudaiappan et al.

(10) Patent No.: US 11,851,577 B2
(45) Date of Patent: Dec. 26, 2023

(54) DIRECT-TO-METAL COATING COMPOSITION

(71) Applicant: SWIMC LLC, Cleveland, OH (US)

(72) Inventors: Sundaresan Avudaiappan, Cleveland, OH (US); Wendy M. Novelli, Cleveland, OH (US); Ganesh S. Desai, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 81 days.

(21) Appl. No.: 17/305,207

(22) Filed: Jul. 1, 2021

(65) Prior Publication Data

US 2021/0403727 A1 Dec. 30, 2021

Related U.S. Application Data

(63) Continuation of application No. 15/945,111, filed on Apr. 4, 2018, now abandoned.

(Continued)

(51) Int. Cl.
*C09D 5/08* (2006.01)
*C09D 5/44* (2006.01)
(Continued)

(52) U.S. Cl.
CPC .............. *C09D 5/084* (2013.01); *C09D 5/00* (2013.01); *C09D 5/4423* (2013.01); *C09D 5/4465* (2013.01); *C09D 7/68* (2018.01); *C09D 7/69* (2018.01); *C09D 7/70* (2018.01); *C09D 167/00* (2013.01); *C09D 175/02* (2013.01); *C09D 175/04* (2013.01); *C08K 3/34* (2013.01); *C08K 3/36* (2013.01); *C08K 7/00* (2013.01); *C08K 7/18* (2013.01); *C08K 9/02* (2013.01);
(Continued)

(58) Field of Classification Search
None
See application file for complete search history.

(56) References Cited

U.S. PATENT DOCUMENTS 4,650,889 A * 3/1987 Plueddemann ....... C07F 7/1804
556/421
4,738,720 A * 4/1988 Eckler .................... C09D 5/084
106/14.39

(Continued)

FOREIGN PATENT DOCUMENTS

CN 1997717 7/2007
CN 101565589 10/2009
(Continued)

OTHER PUBLICATIONS

Hagemeyer—15945111—Hagemeyer—1960-851252—NPL (Year: 1960).*

(Continued)

*Primary Examiner* — John Vincent Lawler (57) ABSTRACT

A fast drying, heavy metal-free, high performance coating composition with outstanding UV resistance, and excellent corrosion resistance coupled with fast dry and long pot life. This coating can be applied over DTM, such as blasted cold rolled steel, or treated cold rolled steel, aluminum and treated aluminum. High corrosion resistance without sacrificing gloss or UV resistance achieved by selecting proper pigments and proper pigment design and packing by advantageously utilizing differing pigment morphologies (sizes and shape).

8 Claims, 2 Drawing Sheets

A representational view illustrating a plurality of pigment particles having different morphologies, demonstrating the space packing properties thus afforded.

Related U.S. Application Data (60) Provisional application No. 62/481,157, filed on Apr. 4, 2017.

(51) Int. Cl.

| | | |
|---|---|---|
| *C09D 7/40* | (2018.01) | |
| *C09D 167/00* | (2006.01) | |
| *C09D 175/04* | (2006.01) | |
| *C09D 175/02* | (2006.01) | |
| *C09D 5/00* | (2006.01) | |
| *C08K 3/36* | (2006.01) | |
| *C08K 9/02* | (2006.01) | |
| *C08K 3/34* | (2006.01) | |
| *C08K 3/30* | (2006.01) | |
| *C08K 3/22* | (2006.01) | |
| *C08K 7/18* | (2006.01) | |
| *C08K 7/00* | (2006.01) | |

(52) U.S. Cl.
CPC ............... *C08K 2003/2241* (2013.01); *C08K 2003/3045* (2013.01); *C08K 2201/005* (2013.01)

(56) References Cited

U.S. PATENT DOCUMENTS

| | | | |
|---|---|---|---|
| 4,837,253 A | 6/1989 | Mansell et al. | |
| 4,849,297 A * | 7/1989 | Mansell | C09C 1/28 106/14.44 |
| 4,863,516 A * | 9/1989 | Mosser | C23C 22/74 106/14.12 |
| 5,043,373 A | 8/1991 | Hegedus et al. | |
| 5,726,225 A * | 3/1998 | Braig | C09D 5/082 524/95 |
| 6,169,141 B1 | 1/2001 | Kurek et al. | |
| 8,420,174 B2 | 4/2013 | Goethlich et al. | |
| 8,962,725 B2 | 2/2015 | Brinkhuis et al. | |
| 9,181,452 B2 | 11/2015 | Brinkhuis et al. | |
| 9,260,626 B2 | 2/2016 | Brinkhuis et al. | |
| 9,284,423 B2 | 3/2016 | Brinkhuis et al. | |
| 2004/0186201 A1* | 9/2004 | Stoffer | C09C 1/56 524/495 |
| 2004/0249043 A1* | 12/2004 | Stoffer | C09D 5/084 524/430 |
| 2005/0129964 A1 | 6/2005 | Hugo | |
| 2006/0063872 A1* | 3/2006 | Teachout | C09D 5/082 524/428 |
| 2007/0240614 A1* | 10/2007 | Lynch | C09D 163/00 106/287.1 |
| 2008/0175992 A1* | 7/2008 | Plieth | C09D 5/082 427/212 |
| 2008/0193743 A1* | 8/2008 | Kruse | C09D 183/06 427/407.1 |
| 2008/0233390 A1 | 9/2008 | Gothlich et al. | |
| 2009/0324983 A1* | 12/2009 | Hackbarth | C23C 22/83 524/441 |
| 2010/0310806 A1* | 12/2010 | Stoll | C09D 5/084 106/14.44 |
| 2011/0151266 A1* | 6/2011 | Huffer | C09D 7/67 524/493 |
| 2012/0263961 A1 | 10/2012 | Beaudry et al. | |
| 2013/0105472 A1* | 5/2013 | Beaudry | C09D 175/04 220/1.5 |
| 2013/0105473 A1* | 5/2013 | Beaudry | B65D 25/34 220/1.5 |
| 2014/0220252 A1 | 8/2014 | Brinkhuis et al. | |
| 2014/0303303 A1* | 10/2014 | Benson | C09D 175/06 524/413 |
| 2017/0096564 A1* | 4/2017 | Seeger | C09D 5/12 |
| 2018/0002532 A1* | 1/2018 | Shan | C09C 1/407 |
| 2018/0163081 A1 | 6/2018 | Goedegebuure et al. | |
| 2018/0163083 A1 | 6/2018 | Brinkhuis et al. | |

FOREIGN PATENT DOCUMENTS

| | | | | |
|---|---|---|---|---|
| CN | 101573187 | | 11/2009 | |
| CN | 101747823 | | 6/2010 | |
| CN | 101952343 | | 1/2011 | |
| CN | 104356884 | * | 2/2015 | .......... C09D 125/14 |
| DE | 19623268 | | 12/1996 | |
| DE | 10204829 | | 7/2003 | |
| DE | 102004034645 | | 2/2006 | |
| DE | 102005038608 | | 2/2007 | |
| DE | 102006062500 | | 7/2008 | |
| EP | 0326723 | | 8/1989 | |
| EP | 1245590 | | 10/2002 | |
| EP | 2374836 | | 10/2011 | |
| EP | 3085748 A1 | * | 10/2016 | .......... C09D 163/00 |
| JP | S59/223762 | * | 12/1984 | .............. C09D 5/08 |
| JP | S59223762 | | 12/1984 | |
| JP | 2000-026799 | | 1/2000 | |
| JP | 2005-015572 | | 1/2005 | |
| JP | 2005-516808 | | 6/2005 | |
| JP | 2010-514866 | | 5/2010 | |
| JP | 2011-052213 | | 3/2011 | |
| JP | 2015-059195 | | 3/2015 | |
| JP | 2016-034621 | | 3/2016 | |
| JP | 2016-065118 | | 4/2016 | |
| NO | 2013050623 | | 4/2013 | |
| WO | 2006015756 | | 2/2006 | |
| WO | 2011124665 | | 10/2011 | |
| WO | WO-2011124665 A1 | * | 10/2011 | .............. B01J 31/04 |
| WO | 2013050574 | | 4/2013 | |
| WO | 2016166382 | | 10/2016 | |
| WO | 2016169543 | | 10/2016 | |
| WO | 2016169544 | | 10/2016 | |
| WO | 2016169545 | | 10/2016 | |

OTHER PUBLICATIONS

Tsurumaki—JP S59 223762 A—MT—paint composition with acicular particle—1984 (Year: 1984).*
Werner Blank—Isocyanates Aromatic Aliphatic—2006 (Year: 2006).*
Gonzalez—cycloaliphatic epoxy hybrids wi amine curing agents—2010 (Year: 2010).*
HALOX_SZP-391JM TDS—anodic passivating pigment—2014 (Year: 2014).*
Xu—CN 104356884 A—MT—protective paint w-needle pigments—2015 (Year: 2015).*
Elizalde—Water-and-Solventborne-Anticorrosion-Coatings—direct-to-metal & PVC—Sep. 2010 (Year: 2010).*
Third Office Action issued for Chinese patent application No. 201880022249.9, dated Mar. 24, 2022 (15 pages, including English translation).
International Search Report for International application No. PCT/US2018/026025, dated Jul. 2, 2018 (5 pages).
Written Opinion for international application No. PCT/US2018/026025, dated Jul. 2, 2018 (6 pages).
R. Brinkhuis et al., "Taming the Michael Addition Reaction: Ultra-Fast Drying, Low VOC, Isocyanate-Free Technology for 2K Coatings," European Coatings Journal, May 2015, pp. 34-40.
"Nuplex Acure—Speed and Control for Coatings: Acure practical formulation guide," Jan. 2016 (18 pages).
T. Fletcher, "Ion-Exchanged Silica Anticorrosive Pigments: A Review and Recent Developments," Coatings Tech, Oct. 2013, pp. 28-39.
"Kuraray Mowital Piloform: Polyvinyl Butyral of Superior Quality," Kuraray Europe GmbH, Apr. 2013, (44 pages).
"Anticorrosives from A-Z: Time for Ultimate Corrosion Protection," Heubach GmbH, Mar. 2016 (16 pages).
"Butvar Polyvinyl Butyral Resin: Properties and Uses," Eastman Chemical Company, Nov. 2013 (32 pages).
Office Action for Chinese patent application No. 201880022249.9, dated Jan. 28, 2021 (8 pages).
DuPont Ti-Pure R-960 Titanium Dioxide datasheet, published 2012 (1 page).
Halox SZP-391 JM Technical Data, ICL Performance Products, published Oct. 27, 2014 (1 page).

(56) References Cited

OTHER PUBLICATIONS

A. Toussaint, "Use of Organic and Inorganic Corrosion Inhibitors in High Performance Coatings," Eastern Coatings Show, Jun. 2, 2015 (36 pages).

R.W. Hagemeyer, "The Effect of Pigment Combination and Solids Concentration on Particle Packing and Coated Paper Characteristics: I. Relationship of Particle Shape to Particle Packing," TAPPI, vol. 43, No. 3 (1960), p. 277-288.

M. G. Gonzalez et al., "Preparation of cycloaliphatic epoxy hybrids with non-conventional amine-curing agents," J. Therm. Anal Calorim., vol. 103 (2011), p. 717-723.

"Learning Center Isocyanate Chemistry: Isocyanates, Aromatic, Aliphatic," Werner Blank, (2006) found online at www.wernerblank.com/polyur/learning/learning_center3.htm, (1 page).

Office Action issued for Japanese patent application No. 2019-554341, dated Nov. 18, 2021 (14 pages, including English translation).

* cited by examiner

Figure 1. A representational view illustrating a plurality of spherical pigment particles in a coating composition.

Figure 2. A representational view illustrating a plurality of pigment particles having different morphologies, demonstrating the space packing properties thus afforded.

Figure 3. A representational view illustrating a plurality of pigment particles having different morphologies, demonstrating the space packing properties thus afforded.

DIRECT-TO-METAL COATING COMPOSITION

This application is a continuation of U.S. patent application Ser. No. 15/945,111, filed on Apr. 4, 2018, which claims priority to U.S. Provisional Patent Application No. 62/481,157 filed on Apr. 4, 2017, the entirety of which is incorporated herein by reference.

The present invention is generally in the field of coating compositions. In various non-exclusive embodiments, this invention is directed to a direct-to-metal coating composition and performance properties relating thereto.

BACKGROUND

Technical Field

A variety of paint compositions have been devised for coating various substrates. These paint compositions are coatings that generally comprise one or more carrier liquids, resins, dispersed pigments or other colorants, and various additives. A paint formulator will select a specific combination of carrier liquid, resin, pigments, and additives to obtain a paint composition that will have adhesion to a particular substrate and that will meet other desired parameters, such as gloss and resistance to weatherability. In some cases, it can be difficult to obtain a satisfactory result when the paint composition is intended for direct application to the intended substrates. In particular, metal substrates are often difficult to get performance with a single layer of pigmented paint. As a result, a primer composition is often applied to metal substrates before applying a pigmented paint composition. The primer coating ordinarily provides adhesion and corrosion resistance, while the top coat provides weatherability and durability. In some instances, a high gloss coating is also applied as a third layer. Requiring the application of two or more layers of compositions increases both the time and cost of coating these substrates. It would be desirable to obtain a direct-to-metal ("DTM") paint composition to avoid the need for a separate primer layer, thus decreasing the time necessary to apply and dry the paint composition. For coated metal surfaces, desirable features of such coatings include a high gloss appearance when dry, corrosion protection, weatherability, and good adhesion directly to metal surfaces without an underlying primer layer.

Recently, malonate-functional polyester and acryloyl resins were introduced by Nuplex Resins B.V., Bergen op Zoom, The Netherlands, as described for example in U.S. Patent Publication No. 2014/0220252. This technology generally comprise 2K systems based on malonate-functional polyesters and acryloyl oligomers, which cure by undergoing a Michael addition reaction. The reaction generally requires base catalyst. Commercial products sold by Nuplex, in particular the ACURE line, generally include strong base catalysts blocked with a dialkylcarbonate, malonate-functional polyester and acryloyl as resins. The function of the dialkylcarbonate is to block the base from catalyzing the reaction between the malonate and the acryloyl, to thereby enable a long pot life after the catalyst is mixed with the other components of the resin system. The blocked base forms an alkyl carbonate anion, which forms an equilibrium with the dialkylcarbonate, carbon dioxide and water. When the coating is applied to a surface, the composition will have a greatly increased surface area, which allows carbon dioxide to escape and which thereby effectively de-blocks the base. This frees the base to catalyze the reaction between the malonate and the acryloyl.

Heretofore, it is believed that Michael Addition-based technology using malonate polyester and acryloyl resins have not been fully effective in DTM applications. It would be desirable to provide DTM coating compositions with various resins that have a long pot life, good adhesion to metal substrates, good corrosion and weathering resistance without the need for an underlying primer layer. Likewise, it would be desirable to provide a DTM technology using other resins. The coating composition of this invention is a fast drying, heavy metal-free, high performance coating composition with outstanding UV resistance, and excellent corrosion resistance coupled with fast dry and long pot life. The coating composition of this invention provides corrosion resistance and weatherability properties in a single formulation, and may be applied as a single layer directly to a metal substrate. The coatings described herein demonstrate strong adhesion to metal substrates such as cold rolled steel, blasted steel, treated steel, aluminum, treated aluminum, which are especially difficult to coat using known compositions without a primer layer.

SUMMARY

The invention provides, in various non-exclusive embodiments, a coating composition comprising a carrier liquid, a binder resin, and a pigment composition, wherein the binder resin may comprise any suitable binder system and in some embodiments comprises one or more of (1) a malonate-acryloyl resin, (2) a polyurethane coating based on (i) one or more isocyanate-polyaspartic esters or (ii) one or more isocyanate-polyester polyols or acrylic polyols, (3) an alkyd resin, or (4) an epoxy resin. The pigment composition comprises a plurality of specialty pigment particles having multiple morphologies, such as two or more of acicular (needle-shaped), platy, and generally spherical morphologies. The use of these pigments having multiple morphologies provides for a high level of pigment loading. Additionally, via the selection of appropriate pigment particles as described herein, a coating composition that cures to form a mid-gloss or high-gloss coating may be provided. The pigment load may be at least 10% by weight and may range up to about 80% by weight, and preferably 20% by weight to 60% by weight, based on the total weight of the coating composition. In one embodiment, one of the pigments is an active corrosion inhibiting pigment. An effective range an active corrosion inhibiting pigment is about 1% by weight to 30% by weight, based on the total weight of the coating composition. In another embodiment, the corrosion inhibiting pigment comprises at least one non-toxic environmentally-friendly micronized cation-containing pigment. Generally, such coating compositions may have a pigment volume concentration (PVC) in the range of 25% by weight to 45% by weight. As used herein, "wt %" shall refer to percentage (%) by weight.

The disclosed method for coating a metal substrate generally comprises providing a metal substrate and coating composition, coating the metal substrate with the coating composition, and allowing the coating composition to cure to form a coating. The coating composition has both the corrosion resistance properties of a primer coating and the weatherability of a top coat in a single formulation, and is applied in a direct-to-metal application in the absence of a primer coat. It is contemplated that, once a first coating has been formed on the metal surface, the coating composition may be re-applied to form an additional coating layer. A metal substrate so coated is also within the purview of some embodiments of the invention.

DETAILED DESCRIPTION

In one embodiment, the coating composition of the present invention comprises one or more binder resins, with a total resin content of the coating composition being about 15 wt % wt % to about 70 wt % wt %, preferably about 20 wt % wt % to about 60 wt % wt %, and more preferably about 30 wt % wt % to about 50 wt % wt %, based on the total weight of the coating composition. The resin of the coating composition may be of one type, or a mixture of various different types of resins. In a certain embodiment, the resin for the coating composition is an acryloyl and malonate-type resin that forms a coating via a Michael Addition reaction. A Michael Addition reaction generally involves compounds that include (i) an acceptor having electron deficient C=C double bonds, for example an acryloyl compound, (ii) a donor having acidic C—H bonds, for example acetoacetate or malonate moieties, and (iii) a base catalyst yielding a nucleophilic carbanion that can add to the double bond. The Michael Addition reaction may be controlled to advantageously provide fast dry time combined with an extended pot life. In some embodiments, such resins can be commercially available, such as ACURE resins (Nuplex Industries Ltd., Louisville, KY) such as ACURE 510-100, ACURE 510-170, and crosslinkers ACURE 550-100, ACURE 550-105, and combinations thereof. ACURE 510-100 and 510-170 are malonate-functional polyester resins in a butyl acetate carrier. ACURE 550-100 and 550-105 crosslinkers contain aliphatic acryloyl resin and have proprietary formulas. In some embodiments, for example, the wet coating composition comprises about 20 wt % to about 35 wt % malonate-functional polyester resin, and about 8 wt % to 15 wt % acryloyl resin, and may include additional resins.

In yet another embodiment, the composition may also include polyurethane resins based on (i) one or more isocyanate-polyester polyol or acrylic polyol compounds or (ii) one or more isocyanate-aspartic ester compounds.

In other embodiments, the binder resin may comprise one or more of alkyd or epoxy binder resins. Alkyd resins or polyesters can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired, with suitable crosslinking agents. Epoxy resins generally comprise epoxies in conjunction with one or more an aliphatic or aromatic amine curing agent, polyamide curing agent. Exemplary epoxy resins include those formed from Bisphenol A, Bisphenol F, cycloaliphatic epoxy or Novolac epoxy, while suitable amine curing agents include aliphatic amines, phenalkamines, cycloaliphatic amines, amido amines, and polyamides.

For adhesion promoting in Michael Addition reactions, the resin can further comprise an adhesion promoting component selected from the group consisting of: (a) at least one liquid epoxy resin between 0.5 to 15 wt %, preferably between 1 to 10 wt %, most preferably between 2 to 6 wt %; and (2) at least one aminosilane between 0.2 to 15 wt %, preferably between 0.5 to 10 wt %, most preferably between 1 to 5 wt %.

For example, the binder system can comprise one or more resins selected from the group consisting of: (a) malonate-functional donor resin between 10 to 50 wt %, preferably between 15 to 35 wt %, most preferably between 20 to 35 wt %; (b) one or more acrylic or polyester polyol resin between 10 to 50 wt %, preferably between 15 to 40 wt %, most preferably between 18 to 30 wt %; and (c) one or more aspartic ester resin between 10 to 50 wt %, preferably between 15 to 35 wt %, most preferably between 20 to 25 wt %; and (e) one or more alkyd or modified alkyd resin between 10 to 50 wt %, preferably between 20 to 45 wt %, most preferably between 30 to 35 wt %. The crosslinker resin system for the malonate-functional donor resin can comprise one or more acryloyl acceptor resin between 5 to 40 wt %, preferably between 6 to 25 wt %, most preferably between 8 to 15 wt %; and for (b) and (c) above can comprise one or more aliphatic isocyanate resins, between 5 wt % to 40 wt %, preferably between 8 wt % to 25 wt % %, and most preferably between 10 wt % to 18 wt %.

In another embodiment, the binder system can comprise one or more cycloaliphatic epoxy resins, between 10 to 50 wt %, preferably between 15 to 35 wt %, most preferably between 18 to 22 wt %, and wherein the crosslinker resin comprise one or more amines between 5 to 50 wt %, preferably between 10 to 35 wt %, most preferably between 20 to 28 wt %.

Figure 1:
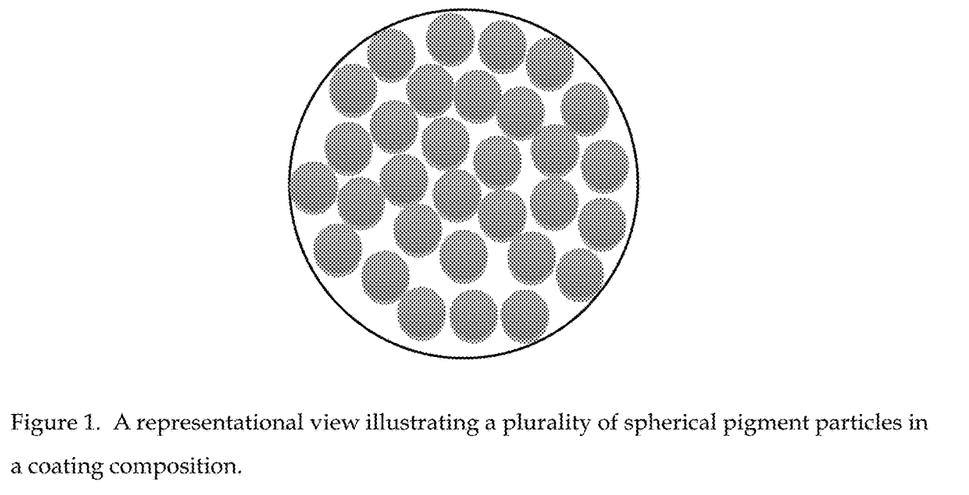
FIG. 1 is a representational view illustrating a plurality of spherical pigment particles in a coating composition.
Figure 2:
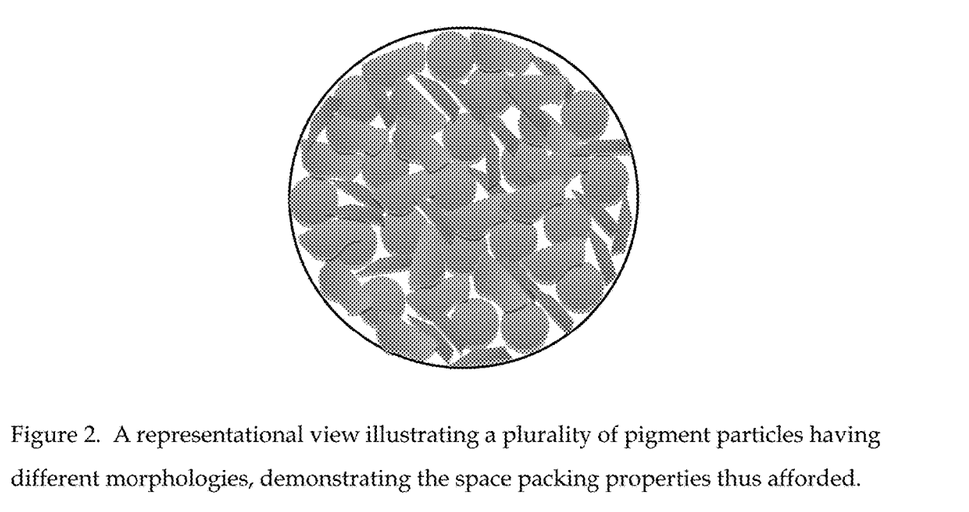
FIGS. 2 and 3 are representational views illustrating a plurality of pigment particles having different morphologies, demonstrating the space packing properties thus afforded.
Figure 3:
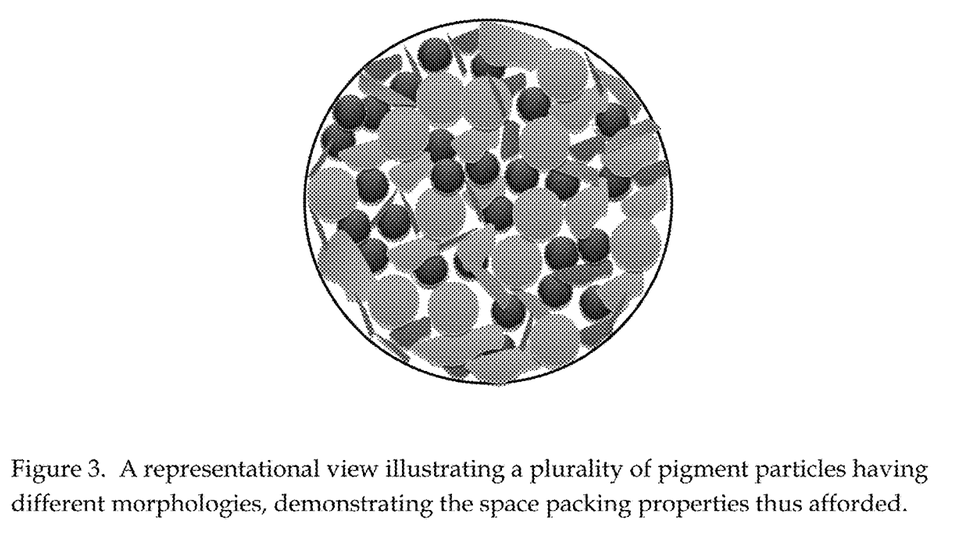

According to this invention, corrosion resistance is enhanced by the addition of a plurality of specialty pigments used in the coating compositions described herein. In some embodiments, two or more specialty pigments having different pigment morphologies are employed. The specialty pigments can be filler pigments, extender pigments, or combinations thereof, wherein the pigment particles have different morphologies enabling high loading and exhibit physical compatibility and a closer space-packing effect whereby the combined pigment volume is less than the sum of the individual volumes of each pigment, as illustrated by comparing FIGS. 1, 2 and 3. As illustrated, a first type of pigment particle fills voids between particles of a second pigment type more efficiently than is possible with particles of the second type alone. Combinations of different extenders having different morphologies, such as spherical, acicular, and platy pigments, allows for increased levels of pigment and improved packing of the pigment, making the coating less porous, and in turn improving barrier qualities such as water resistance. Corrosion resistance generally improves as pigment volume concentration (PVC) increases, and it is generally desirable in connection with the present disclosure to provide compositions wherein the pigment concentration of the composition is between 15 to 60%, more preferably between 25 to 50%, and most preferably between 35 to 45%. In one embodiment, at least two different types of pigment particles are selected, each having a different type of morphology that can generally be spherical, acicular, or platy. Acicular pigments like Wollastonite can fill in the voids created by spherical pigments (like barium sulfate and TiO2). Platy pigments like talc and mica have a high aspect ratio, and for this reason such pigments are believed to decrease ionic mobility in the coating layer which will decrease or delay corrosion and blistering. Platy pigment particles are believed to improve wet adhesion.

Low oil-absorption pigments are desired, and preferred pigments have an oil absorption below about 25 g/100 g.

Without wishing to be bound by theory, it is believed that acicular pigment particles like wollastonite or platy pigment particles such as talc and mica with wide aspect ratios fill voids created by spherical particles such as barium sulfate, titanium dioxide, or nepheline syenite, decreasing ionic mobility in the coating layer which then decreases or delays corrosion and blistering. In one embodiment, the specialty pigments comprise: (a) at least one substantially spherical pigment; (b) at least one acicular shaped pigment; and (c) at least one platy-shaped pigment. The coating composition comprises about 5 wt % wt % to about 50 wt % wt % of at least one spherical shaped pigment particles (such as titanium oxide or barium sulfate); 2 wt % wt % to about 30 wt % wt % acicular filler pigment particles (such as wollastonite), and 1 wt % to about 30 wt % platy filler pigment particles (such as mica or talc). Preferably, the composition comprises about 10 to 30 wt % of at least one substantially spherical filler pigment particles having a median particle size between 0.1 to 20 μm, about 3 to 20 wt % acicular filler pigment particles having median particle size between 0.1 to 20 μm, and about 3 to 20 wt % platy filler pigment particles having median particle size of 0.1 to 20 μm. More preferably, the composition comprises about 15 to 25 wt % spherical filler particles, about 4 to 12 wt % acicular filler particles, and about 4 to 12 wt % platy filler particles. Preferable median particle sizes are 0.1 to 10 μm, and most preferable median particle sizes are between 0.3-6 μm. All weight percentages are based on the total weight of the coating composition. Median particle size information is based on D50 Sedigraph method.

In some embodiments, at least one pigment is a corrosion inhibiting pigment. Corrosion inhibiting pigments are pigments which have a chemical nature that acts to inhibit or reduce corrosion, such as a non-toxic environmentally-friendly micronized cation-containing pigments such as calcium ion-exchanged amorphous silica pigments (for example, commercially available pigments such as NOVI-NOX XCA 02 from SNCZ (France); HEUCOSIL CTF, from Heubach GmbH; SHIELDEX AC-3, SHIELDEX AC-5, from W. R. Grace). In another embodiment, the corrosion inhibiting pigment can be at least one micronized anodic passivating pigment. Examples of micronized anodic passivating pigments include, for example, zinc phosphate corrosion inhibitors (for example, HALOX SZP-391 JM, commercially available from ICL Performance Products LP; HEUCOPHOS ZPA and HEUCOPHOS ZAPP, commercially available from Heubach GmbH). These compounds reduce corrosion through ion exchange phenomena or other chemical pathways. It is contemplated in some embodiments that the corrosion inhibiting pigment can include a blend of different types of corrosion inhibitors. The coating composition comprises about 1 wt % to about 30 wt % corrosion inhibiting pigments such as calcium ion exchanged silica, or strontium zinc phosphosilicate, preferably about 2 wt % to about 20 wt %, and more preferably about 3 wt % to about 15 wt %.

Exemplary pigments include those indicated in the following table:

TABLE 1

| Particle Shape | Description | Median Particle Size (μm) |
| --- | --- | --- |
| Platy | Ultrafine/microcrystalline talc | 0.9 |
| Acicular | Calcium Silicate (CaSiO3) | 3 |
| Spherical | Synthetic Barium Sulfate | 0.7 |

TABLE 1-continued

| Particle Shape | Description | Median Particle Size (μm) |
| --- | --- | --- |
| Spherical | Calcium Ion-exchanged amorphous silica | 3 |
| Spherical | Rutile TiO2 pigment | 0.5 |
| Platy | Muscotive mica | 5 |
| Spherical | Strontium Zinc Phosphosilicate | 2 |

Other pigments may also provide color, weatherability, or other properties to the coating. By reducing permeability and/or enhancing strength of the coating, these pigments may also indirectly reduce corrosion of the underlying substrate. In general, color pigments can be organic or inorganic pigments, and can be present in the range of 0.5 wt % to 30 wt %, preferably 1 wt % to 20 wt %, and more preferably between 2 wt % to 15 wt %, based on the total weight of the coating composition.

The three above-denoted pigment types may be combined in a single coating composition to provide a direct-to-metal coating with good adhesion, corrosion resistance, durability, color, and gloss. Many commercial coating systems require a layering of three separate compositions: a primer layer to provide corrosion resistance, a topcoat to provide color, and a clear coat to provide weatherability. The coating compositions described herein provide all of these features in a single coating composition.

Increases in PVC generally also result in reduced gloss. However, by using at least some ultrafine pigments (0.1-5 microns), both PVC and pigment packing can be increased while also maintaining gloss. For high gloss paint, the coating preferably has a 60° gloss value of at least 70. For mid-gloss applications, the coating preferably has a 60° gloss value greater than 10 and less than 70. The type and ratio of pigments may be selected to provide a desired level of gloss. The coating composition should generally have a PVC of about 10 to about 80, preferably about 20 to about 60, and more preferably about 25 to about 45.

Platy pigments in combination with corrosion inhibitors (such as calcium ion exchange silica compounds or phosphate and phosphosilicate inhibitors) improve wet adhesion of the coating and liberate metal ions as water and oxygen from the atmosphere penetrate the coating, forming metal oxides and hydroxides that plug open pores in the coating to decrease permeability of the coating and reduce further corrosion.

The pigment composition may include any other suitable pigment particles including organic and/or inorganic color pigments, such as azo pigments, anazurite, aluminum silicate, aluminum potassium silicate, aluminum paste, anthraquinone pigments, antimony oxide, barium metaborate, barium sulfate, cadmium sulfide, cadmium selenide, calcium carbonate, calcium metaborate, calcium metasilicate, carbon black, chromium oxides, clay, copper oxides, copper oxychloride, dioxazine pigments, feldspar, hansa yellows, iron oxides such as yellow and red iron oxides, isoindoline pigments, kaolinite, lithopone, magnesium silicates, metallic flakes, mica, napthol pigments such as napthol reds, nitroso pigments, nepheline syenite, perinone pigments, perylene pigments, polycyclic pigments, pyrropyrrol pigments, pthalocyanines such as copper pthalocyanine blue and copper pthalocyanine green, quinacridones such as quinacridone violets, quinophthalone pigments, silicates, sulfides, talc, titanium dioxide, ultramarine, zinc chromate, zinc oxide, and zinc phosphate. In addition, pearlescents, optical brighteners, ultraviolet stabilizers, and the like may be added to a pigment vehicle. Color pigments are generally present between 0.5 wt % to about 30 wt %, preferably 1 wt % to 20 wt %, and more preferably 2 wt % to 15 wt %, based on the total weight of the coating composition.

The pigment may be provided in the form of a pigment vehicle that includes a wetting resin and that also may include any one or more of dispersants, surfactants, wetting agents, deflocculants, and stabilizers. Any suitable dispersant, such as any one or more of anionic dispersants, cationic dispersants, amphoteric dispersants, or nonionic dispersants may be used in conjunction with a pigment vehicle. Similarly, any suitable wetting agents such as any one or more of anionic wetting agents, cationic wetting agents, amphoteric wetting agents, or nonionic wetting agents may be used in conjunction with a pigment vehicle.

The carrier liquid is a fluid component of a coating composition that serves to carry all of the other components of the composition, and that evaporates as a composition dries. Any suitable carrier liquid may be used in methods of manufacturing a coating composition. The carrier liquid may include any one or more of a polar and non-polar solvents, such as the solvents described here in conjunction with a pigment dispersion resin. In addition, the carrier liquid may have the same or different composition as solvents used in pigment dispersion resin, a method of manufacturing a pigment dispersion resin, or a pigment vehicle. Exemplary carrier liquids include isopropanol, 2-butoxy ethanol, and n-butyl alcohol; ketones, such as acetone, methyl ethyl ketone, methyl propyl ketone, and methyl isobutyl ketone; aromatic hydrocarbons such as toluene and xylene; aliphatic hydrocarbons such as mineral spirits.

Additives may be added at any suitable point during methods of manufacturing a coating composition. Additives that may be included in a coating composition include any one or more of antifoaming agents, dispersants, surfactants, pot-life extenders, UV stabilizers, adhesion promoters, wetting agents, rheology modifiers, leveling agents, anti-blocking agents, thickeners, thixotropic agents, drying agents, anti-settling agents, and flattening agents. When used, such additives may be present in any amounts suitable for their intended purposes. It is contemplated that some additives will play multiple roles in a coating composition.

The coating composition of this invention can be applied directly over the surface of a metal substrate, such as blasted cold rolled steel, aluminum, or treated metals (such as those pretreated with Bonderite® coatings, commercially available from Henkel). Various application techniques such as conventional spray, air-assisted airless (AAA) or electrostatic spraying can be used for coatings applications. Since the coating composition has both the corrosion resistance properties of a primer coating and the weatherability of a top coat, all within a single formulation, it can be applied in a direct-to-metal application in the absence of a primer coat. The coating composition is then allowed to cure to form a coating. It is contemplated that, once a first coating has been formed on the metal surface, the coating composition may be re-applied to form an additional coating layer. A metal substrate so coated is also within the purview of some embodiments of the invention.

EXAMPLES

The present invention is more particularly described in the following examples which are provided to be illustrative only but should not be construed as limiting a scope of the invention since numerous modifications and variations therein will be apparent to those skill in the art. All weight percentages ("wt %") are based on the total weight of the coating composition.

Control Example

A coating composition containing a blend of Michael Addition resins was prepared by mixing the following ingredients in the indicated amounts:

| Component | Description | Wt % |
| --- | --- | --- |
| Donor resin | malonate-functional polyester | 33.1 |
| Acceptor resin | aliphatic acryloyl | 18.1 |
| Pigment | titanium dioxide | 36.8 |
| Solvent | n-butyl acetate | 2.7 |
|  | n-Propanol | 3.9 |
| Additives | liquid hindered amine light stabilizer | 0.46 |
|  | high molecular weight dispersant | 1.64 |
|  | silicone based leveling agent | 0.28 |
|  | Open time extender | 0.52 |
| Catalyst | Carbonate blocked base catalyst | 2.5 |

The pigment volume concentration of Control Example was 17 with a total pigment weight of 37%.

Example 1

Isocyanate-free coating composition based on Michael Addition reaction was prepared by mixing the following ingredients in the indicated amounts.

| Component | Description | Wt % |
| --- | --- | --- |
| Donor Resin | malonate-functional polyester | 23.3 |
| Acceptor resin | aliphatic acryloyl | 10.7 |
| Pigment | calcium ion-exchanged amorphous silica | 13.4 |
|  | micronized mica | 5.8 |
|  | micronized calcium silicate | 8.9 |
|  | micro barium sulfate | 7.1 |
|  | Titanium dioxide | 13.1 |
| Solvent | n-butyl acetate | 9.7 |
|  | n-Propanol | 3 |
| Additives | Bis (1,2,2,6,6-pentamethyl-4-piperidyl)sebacate stabilizer | 0.3 |
|  | high molecular weight dispersant | 1.8 |
|  | urea modified polyamide solution | 0.9 |
|  | acrylic polymer leveling agent | 0.3 |
| Catalyst | Carbonate blocked base catalyst | 1.7 |

The PVC of the coating composition was 38 and total pigment content was 48 wt %. Performance of single layer of the coating applied to panels of iron phosphate cold rolled steel with polymeric sealer and blasted hot rolled steel when subjected to the salt spray test is presented in Table 2.

Example 2

A polyurethane coating composition was prepared by mixing the following ingredients in the indicated amounts:

| Component | Description | Wt % |
| --- | --- | --- |
| Resins | acrylic polyol | 27 |
| Pigment | calcium ion-exchanged amorphous silica | 5 |
|  | micronized talc | 10 |
|  | micronized calcium silicate | 6 |
|  | micro barium sulfate | 4 |
|  | titanium dioxide | 15 |
| Solvent | n-butyl acetate | 10 |
|  | methyl n-amyl ketone | 6.8 |

-continued

| Component | Description | Wt % |
|---|---|---|
| Additives | bentonite clay derivative | 0.5 |
| | UV absorber & stabilizer | 0.5 |
| | urea modified polyamide solution | 1.2 |
| | high molecular weight dispersant | 1 |
| Hardener | Aliphatic polyisocyanate | 13 |

The PVC of the coating composition was 30 and total pigment content was 40 wt %. Performance of single layer of the coating applied to panels of iron phosphate cold rolled steel with polymeric sealer and blasted hot rolled steel when subjected to the salt spray test is presented in Table 2.

Example 3

A polyaspartic coating composition was prepared by mixing the following ingredients in the indicated amounts

| Component | Description | Wt % |
|---|---|---|
| Resins | Aspartic acid ester resin | 22 |
| Pigment | calcium ion-exchanged amorphous silica | 5 |
| | micronized talc | 8 |
| | micronized calcium silicate | 6 |
| | micro barium sulfate | 4 |
| | titanium dioxide | 15 |
| Solvent | n-butyl acetate | 7 |
| | Acetone | 10 |
| | methyl n-amyl ketone | 1.5 |
| Additives | treated silica | 0.8 |
| | $K_2O$ Aluminosilicate | 1.5 |
| | Bis (1,2,2,6,6-pentamethyl-4-piperidyl)sebacate stabilizer | 0.35 |
| | Hydroxyphenyl-triazine UV absorber | 0.65 |
| | high molecular weight dispersant | 2 |
| | solvent free dispersing agent | 0.35 |
| | polyacrylate-based surface additive | 0.4 |
| Hardener | Aliphatic polyisocyanate | 16 |

The PVC of the coating composition was 28% and total pigment content was 40 wt %. Performance of single layer of the coating applied to panels of iron phosphate cold rolled steel with polymeric sealer and blasted hot rolled steel when subjected to the salt spray test is presented in Table 2.

All of the examples demonstrated remarkable direct-to-metal adhesion and salt spray resistance, substantially improved as compared to the control.

RESULTS

The coating compositions of the Control Example and Examples 1-3 were applied to iron phosphate cold rolled steel with polymeric sealer and blasted cold rolled steel and tested for gloss, salt spray corrosion resistance, and Xenon weathering resistance.

As shown in the table below, each formulation demonstrated acceptable gloss and gloss retention at relatively high PVC and high corrosion resistance. On blasted steel creepage was 2 mm while on iron phosphate treated steel creepage was 3 mm.

TABLE 2

| Resin | Description | PVC | Gloss @60° | Salt Spray, 500 hrs creepage (mm) | Xenon UV Resistance (1200 hrs) 60° Gloss Retention (%) | ΔE |
|---|---|---|---|---|---|---|
| Control | High gloss white | 17 | 85 to 90 | Failed* | 90 to 95 | 0.2 to 0.3 |
| Malonate - Acryloyl (Ex. 1) | High Gloss White Base | 38 | 85 to 90 | 2-3 | 90 to 95 | 0.2 to 0.25 |
| Polyurethane (Ex. 2) | High Gloss White Base | 30 | 85 to 90 | 2-3 | 95 to 100 | 0.2 to 0.5 |
| Polyaspartic (Ex. 3) | High Gloss White Base | 28 | 85 to 90 | 2-3 | 80 to 85 | 0.5 to 1.5 |

The dry film thickness (DFT) of all coatings was 3.5±0.5 mils.

(*) The Control Example failed within 168 hours in salt spray test (ASTM B117) with creepage of more than 5 mm at this duration.

Examples 1-3 had a dry-to-touch time of 30 minutes and dry to handle time of 90 minutes as determined in accordance with ASTM D1640. Gloss was determined in accordance with ASTM D523. The 60° gloss retention and color change (ΔE) was determined with exposure in Xenon Accelerated Weathering test (ASTM G155-05a Cycle 7A). Creepage (in mm) tested on blasted cold rolled steel and on Bonderite 1000 P99X substrates after 500 hrs of Salt Spray tests, as determined in accordance with ASTM B117 and ASTM D1654, Procedure A, Method 2 (creep rating).

It is thus seen that the present disclosure provides, in various embodiments, a direct-to-metal coating composition, a method of manufacturing a coating composition, a method of coating a substrate, and a coated substrate.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A direct to metal coating composition comprising:
   (a) a binder resin system comprising a malonate-acryloyl resin that forms a coating by Michael addition reaction;
   (b) a plurality of filler and extender pigments having median particle size of 0.1 to 10 µm comprising
      (i) between 5 to 50 wt %, spherical shaped pigment;
      (ii) between 2 to 30 wt acicular shaped pigment; and
      (iii) between 1 to 30 wt % platy-shaped pigment; and
   (c) a corrosion inhibiting pigment,
   wherein the coating composition is applied to a substrate as a direct-to-metal coating having creep from scribe of less than 3 mm after 500 hours of salt spray testing according to ASTM B117, and color change (ΔE) of less than about 0.5 after 1200 hours of uv exposure in Xenon Accelerated Weather testing according to ASTM G155-05a Cycle 7A.

2. The composition of claim 1, further comprising a color pigment.

3. The composition of claim 1, wherein the pigment volume concentration of the composition is between 10 to 80%.

4. The composition of claim 1, wherein the corrosion inhibiting pigment comprises at least one non-toxic environmentally friendly micronized cation-containing pigment.

5. The composition of claim 1, wherein the corrosion inhibiting pigment is between 1 to 30 wt %, based on the total weight of the coating composition.

6. The composition of claim 1, wherein the corrosion inhibiting pigment comprises at least one micronized anodic passivating pigment.

7. The composition of claim 6, wherein the micronized anodic passivating pigment is present in an amount between 3 wt % to 15 wt %, based on the total weight of the coating composition.

8. The composition of claim 2, wherein the color pigments comprise at least one organic or inorganic color pigment between 0.5 to 30 wt %, based on the total weight of the coating composition.

* * * * *